United States Patent

[11] 3,547,141

| [72] | Inventors | Claude L. Alexander<br>Gibson Island;<br>Lysle B. Gray, Baltimore; John I. Long, Timonium, Md. |
|---|---|---|
| [21] | Appl. No. | 733,080 |
| [22] | Filed | May 29, 1968 |
| [45] | Patented | Dec. 15, 1970 |
| [73] | Assignee | Brunswick Corporation<br>a corporation of Delaware |

[54] FLUID CONTROL SYSTEM
7 Claims, 4 Drawing Figs.

[52] U.S. Cl. .................................................. 137/263,
                                                      137/624.18
[51] Int. Cl. .................................................. B67d 5/04
[50] Field of Search .......................................... 137/263,
                                              266, 265, 635, 557

[56] References Cited
UNITED STATES PATENTS

| 1,976,445 | 10/1934 | Jurs | 137/635 |
| 2,096,374 | 10/1937 | Jensen | 137/635X |
| 2,356,786 | 8/1944 | Harman et al. | 137/263X |
| 2,557,438 | 6/1951 | Johnson | 137/263X |
| 2,625,429 | 1/1953 | Coles | 137/635 |
| 2,812,111 | 11/1957 | Wright et al. | 137/263X |
| 2,966,921 | 1/1961 | Whiteman | 137/266X |
| 3,017,900 | 1/1962 | Olson | 137/635 |
| 3,275,061 | 9/1966 | Williams et al. | 137/263 |
| 3,428,072 | 2/1969 | Welch | 137/263X |

*Primary Examiner*—M. Cary Nelson
*Assistant Examiner*—Robert J. Miller
*Attorney*—Hofgren, Wegner, Allen, Stellman & McCord ABSTRACT: A fluid control system for controlling the delivery of fluid, such as fuel, from a plurality of supplies, such as fuel tanks, to a plurality of receivers, such as engines. The system includes a manually operable control selectively positionable to operate valved means associated with the fluid ducts of the system to operate different valves for selective control of the supply and receiver connections. The control system may be used in marine installations for facilitated control of fuel delivery from a number of storage tanks to different engines, such as port and starboard engines and auxiliary engines.

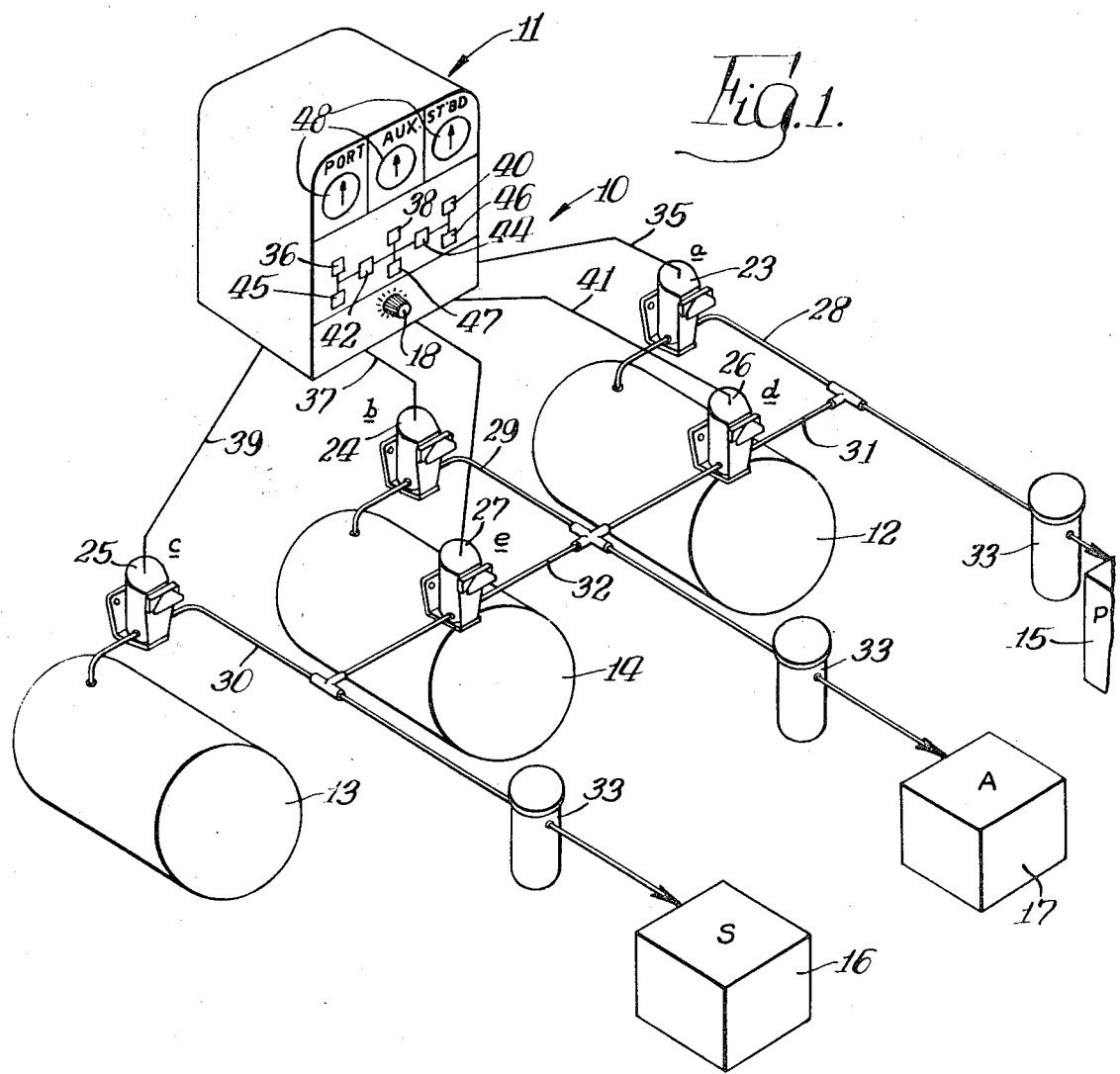

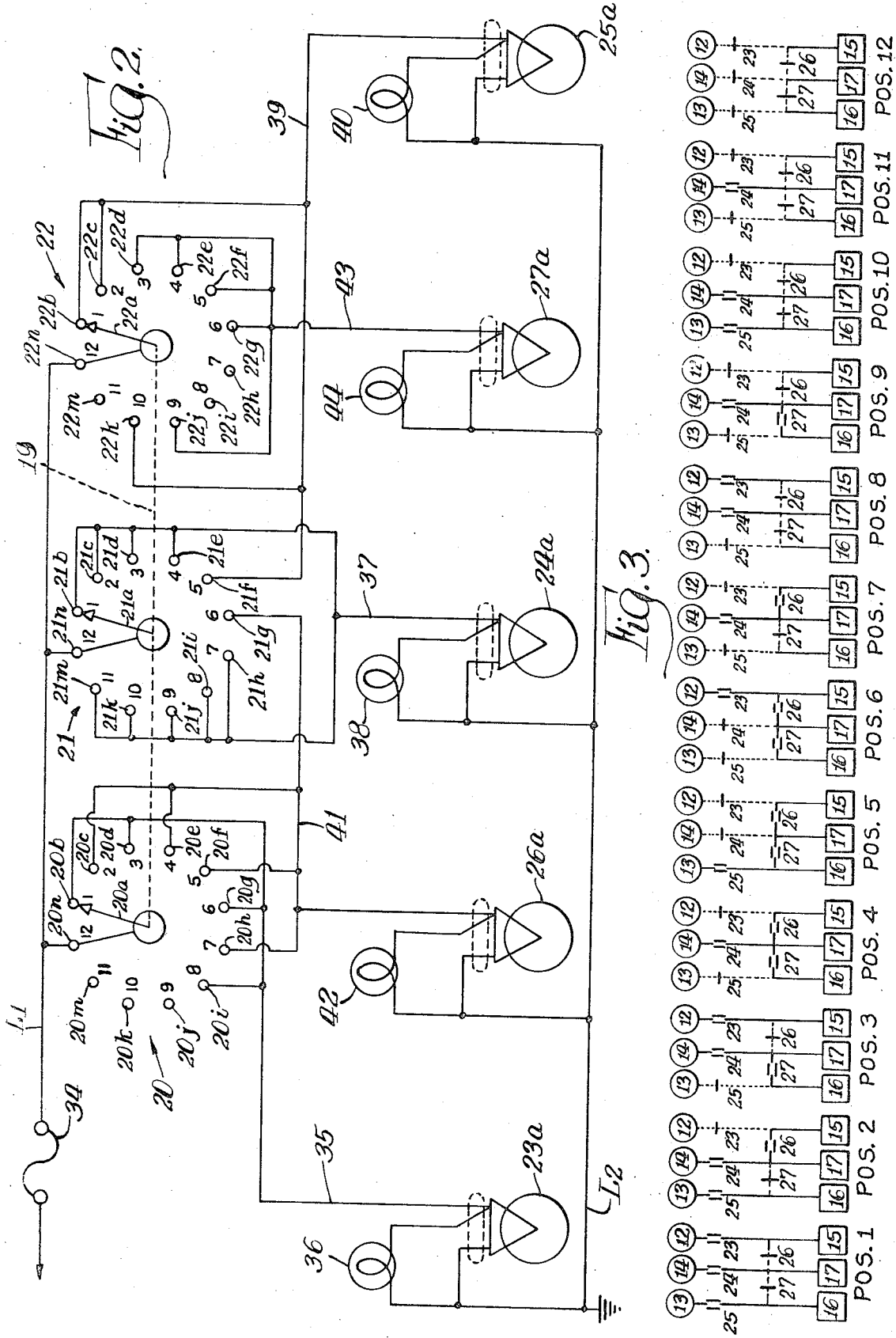

3,547,141

1

FLUID CONTROL SYSTEM

BACKGROUND OF THE INVENTION

1. Field of the Invention

This invention relates to fluid control systems and in particular to systems for selectively connecting any one of a plurality of fluid supplies to any one of a plurality of fluid receivers. More specifically, the invention relates to the control of valves in a multiple duct system by manual selector means for facilitated selective interconnection of the supplies and receivers.

2. Description of the Prior Art

Heretofore, where delivery of fluid, such as fuel, from a plurality of supply tanks to a plurality of receivers, such as engines, has been desired, fluid systems having individually manually controlled valves have been utilized. Illustratively, such systems have utilized manually controlled valves for selecting any one of a plurality of supply tanks and separate manually controlled valves for selecting any one of a plurality of engines.

Other known fluid control systems have utilized relatively complex valving and multiple manually controlled selectors for effective selective interconnection of such fuel tanks and engines. In one such system, a single selector control is provided for selecting any or all of a plurality of fuel tanks for use with a single engine.

SUMMARY OF THE INVENTION

The present invention provides an improved simplified fluid control system wherein only a single manual operating member is provided for selectively operating a plurality of valve means to provide desired selective connection of any one or plurality of supplies to any one or plurality of receivers as desired by the user. The invention comprehends providing an extremely simple fluid system utilizing an effective minimum number of valves in combination with the single manually operable control element, thereby to provide an extremely simple and economical structure while yet providing the highly desirable facilitated selective control.

BRIEF DESCRIPTION OF THE DRAWING

Other features and advantages of the invention will be apparent from the following description taken in connection with the accompanying drawings wherein:

FIG. 1 is a schematic isometric view of a control system embodying the invention;

FIG. 2 is a schematic wiring diagram thereof;

FIG. 3 is a schematic flow chart illustrating the arrangement of the system in each of the 12 positions of the control element; and FIG. 4 is a schematic wiring diagram of the engine indicator lights.

DESCRIPTION OF THE PREFERRED EMBODIMENT

In the exemplary embodiment of the invention, as disclosed in the drawing, a fluid control system generally designated 10 is shown to comprise a control generally designated 11 for controlling the delivery of a fluid, such as liquid fuel, from a plurality of supplies, herein illustratively storage tanks 12, 13 and 14, to a plurality of receivers, herein illustratively engines 15, 16 and 17. Illustratively, the fluid control system 10 may be utilized in a marine installation, such as a cabin cruiser, wherein the engine 15 may comprise the port engine, the engine 16 may comprise the starboard engine, and the engine 17 may comprise the auxiliary generator engine. The control 11 may be adapted for mounting on the dash (not shown), such as on the cruiser (not shown).

In such installations, it is desirable to permit the user to select quickly and accurately any one of a number of different interconnections between the fuel supply tanks and the engines. The control 11 is adapted to provide such facilitated control by means of a single manually operable control element comprising a control knob 18 secured to a control shaft 19 for operating concurrently a plurality of rotary switches 20, 21 and 22, as shown in FIG. 2. The switches may comprise conventional single pole, 12-position switches coaxially mounted for concurrent positioning of the movable contacts 20a, 21a and 22a respectively thereof.

As shown in FIG. 1, the control 11 is connected to a plurality of valves 23, 24, 25, 26 and 27, which may comprise conventional solenoid operated valves adapted for use in the desired environment. Illustratively, where the installation is a marine installation, the valves may comprise conventional marine type valves which are adapted for operation in any position. As seen in FIG. 1, valve 23 is connected in a first fluid duct 28 connecting tank 12 to the port engine 15. Valve 24 is connected in a second fluid duct 29 connecting second tank 14 to auxiliary engine 17 and valve 25 is connected in a third fluid duct 30 connecting starboard tank 13 to a starboard engine 16. Valve 26 is connected in a fourth, cross duct 31 connected between duct 28 and duct 29 downstream of valves 23 and 24, and valve 27 is connected in a fifth, cross duct 32 connected between duct 29 and duct 30 downstream of valves 24 and 25. Each of ducts 28, 29, and 30 may further be provided with conventional fuel filters 33.

Manipulation of control element 18 to selectively position switches 20—22 effects selective operation of different valves 23—27 to provide herein 12 different connection arrangements. More specifically, as shown in FIGS. 2 and 3, when the movable contacts 20a, 21a and 22a are disposed by the control element 18 in the first position, the valves 23, 24 and 25 are opened and the valves 26 and 27 are closed to connect port engine 15 to the port tank 12, auxiliary engine 17 to the center tank 14, and starboard engine 16 to the starboard tank 13. This is effected by the circuitry of FIG. 2, by connection of the movable contact 20a to power supply lead L1, which may be provided with a suitable safety fuse 34, and connection of first fixed contact 20b of switch 20 to the solenoid coil 23a of control valve 23 by means of conductor 35 which, in turn, is connected to the other power supply lead L2, illustratively comprising a grounded lead. A signal light 36 may be connected in parallel with solenoid coil 23a. The movable contact 21a of switch 21 is connected to a fixed contact 21b thereof which, in turn, is connected through a conductor 37 to solenoid coil 24a of valve 24 which, in turn, is connected to power supply lead L2 and a signal light 38 being connected in parallel with the solenoid coil 24a. The movable contact 21a of switch 21 is connected to power supply lead L1. Movable contact 21a of switch 22 is connected to a first contact of 22b thereof which, in turn, is connected through a conductor 29 to the solenoid coil 25a of the valve 25 which, in turn, is connected to the power supply lead L2. A signal light 40 is connected in parallel to the coil 25a. The movable contact 22a is connected to the power supply lead L1. Thus, in the first portion of the control element 18, valves 23, 24 and 25 are open and valves 26 and 27 are closed, as shown in FIG. 3, to provide the desired connection of the tanks severally to the respective engines.

In the second position of the control element 18, movable contact 20a engages second fixed contact 20c of switch 20 which contact is connected through a conductor 41 to the solenoid coil 26a of valve 26 which, in turn is connected to power supply lead L2 and having a signal light 42 connected in parallel thereto. Movable contact 21a of switch 21 is connected to fixed contact 21c thereof which is connected to conductor 37 and movable contact 22a is connected to fixed contact 22c of switch 22 which is connected to conductor 39. Thus, in the second position, as shown in FIG. 3, valve 23 is closed while valves 24 and 25 are open and valve 27 is closed while valve 26 is open whereby tank 14 is connected to auxiliary engine 17 and port engine 15, and tank 13 is connected to starboard engine 16.

In the third position of control element 18, movable contact 20a contacts fixed contact 20d of switch 20 which is connected to conductor 35; fixed contact 21a contacts fixed contact 21d of switch 21 which is connected to conductor 37 and movable contact 22a contacts contact 22d of switch 22 which is connected to a conductor 43 connected to solenoid coil 27a of valve 27 which, in turn, is connected to power supply lead L2 and having a signal light 44 connected in parallel thereto. Thus, in position 3, valves 23, 24 and 27 are open, valves 25 and 26 being closed to connect port engine 15 to tank 12 and starboard engine 16 and auxiliary engine 17 to tank 14.

In the fourth position, contact 20a contacts fixed contact 20e of switch 20 which is connected to conductor 41, movable contact 21a contacts fixed contact 21e of switch 21 connected to conductor 37 and movable contact 22a contacts fixed contact 22e of switch 22 connected to conductor 43. Thus, in the fourth position, valves 24, 26 and 27 are open and valves 23 and 25 are closed thereby connecting each of the engines 15, 16 and 17 to the center tank 14.

In the fifth position, movable contact 20a contacts fixed contact 20f of switch 20 connected to conductor 41; movable contact 21a contacts fixed contact 21f of switch 21 connected to conductor 39; and movable contact 22a contacts fixed contact 22f of switch 22 connected to conductor 43 whereby each of valves 25, 26 and 27 is open and valves 23 and 24 are closed thereby connecting each of the engines 15, 16 and 17 to starboard tank 13.

In the sixth position, movable contact 20a contacts fixed contact 20g of switch 20 connected to conductor 35; movable contact 21a contacts fixed contact 21g of switch 21 connected to conductor 41; and movable contact 22a contacts fixed contact 22g of switch 22 connected to conductor 43 whereby each of valves 23, 26 and 27 is open and valves 24 and 25 are closed thereby connecting each of the engines 15, 16 and 17 to port tank 12.

In the seventh position, movable contact 20a contacts fixed contact 20h of switch 20 connected to conductor 41; movable contact 21a contacts fixed contact 21h of switch 21 connected to conductor 37; and movable contact 22a contacts fixed contact 22h of switch 22 which is unconnected, whereby each of valves 24 and 26 is open and valves 23, 25 and 27 are closed whereby port engine 15 and auxiliary engine 17 are connected to center tank 14.

In the eighth position, movable contact 20a contacts fixed contact 20i of switch 20 connected to conductor 35; movable contact 21a contacts fixed contact 21i which is unconnected; and movable contact 22a contacts fixed contact 22i which is unconnected, whereby each of valves 23 and 24 is open and valves 25, 26 and 27 are closed whereby engine 15 is connected to tank 12 and engine 17 is connected to tank 14.

In the ninth position, movable contact 20a contacts fixed contact 20j of switch 20 which is unconnected; movable contact 21a contacts fixed contact 21j of switch 21 connected to conductor 37; and movable contact 22a contacts fixed contact 22j of switch 22 connected to conductor 43, whereby each of valves 24 and 27 is open and valves 23, 25 and 26 are closed, thereby connecting engines 16 and 17 to tank 14.

In the tenth position, movable contact 20a contacts fixed contact 20k of switch 20 which is unconnected; movable contact 21a contacts fixed contact 21k of switch 21 connected to conductor 37; and movable contact 22a contacts fixed contact 22k of switch 22 connected to conductor 39, whereby each of valves 24 and 25 is open and valves 23, 26 and 27 are closed, thereby connecting engine 16 to tank 13 and engine 17 to tank 14.

In the eleventh position, movable contact 20a contacts fixed contact 20m of switch 20 which is unconnected; movable contact 21a contacts fixed contact 21m of switch 21 connected to conductor 37; and movable contact 22a contacts fixed contact 22m which is unconnected, whereby valve 24 is open and valves 23, 25, 26, and 27 are closed, thereby connecting engine 17 to tank 14.

In position 12, the movable contact 20a contacts fixed contact 20n which is permanently connected to the movable contact 20a and to the power supply lead L1; movable contact 21a contacts fixed contact 21n which is permanently connected to movable contact 21a and power supply lead L1; and movable contact 22a contacts fixed contact 22n which is permanently connected to movable contact 22a and power supply lead L1. Thus, in the twelfth position, all valves are closed to provide an "Off" condition of the fluid control system 10.

The signal lights 36, 38, 40, 42 and 44 are displayed on the control 11 to indicate the open condition of the corresponding valves 23, 24, 25, 26 and 27 respectively. Further, the operation of the selected engines is indicated by suitable signal lights including port engine signal light 45, starboard engine signal light 46 and auxiliary engine signal light 47, which are connected to the respective engine ignitions (not shown). The engine indicator signal lights are displayed on the control 11 in association with signal lights 36, 38, 40, 42, and 44, to provide an improved indication to the user of the operating arrangement of the fluid control system. As shown, suitable fuel tank gauges 48 may be provided also on the control for indicating the quantity of fuel in the respective tanks.

Thus, the fluid control system 10 permits any one of the plurality of engines to be connected to any one of the different fuel tanks by simple manipulation of the single control knob 18. Thus, in emergencies, rapid coordinated changes in the fluid system may be effected. By utilization of the improved control 11, a program of different tank and engine connections may be preselected for providing the desired improved facilitated selectivity. Thus, desired changes in the interconnections may be effected by the user without requiring determination of the individual valve conditions necessary to effect the desired rearrangement, permitting the user to concentrate on other duties substantially without distraction by the resetting of the fluid system control. Thus, the present control offers a highly desirable safety feature in the operation of marine craft and the like.

While we have shown and described one embodiment of our invention, it is to be understood that it is capable of many modifications. Changes, therefore, in the construction and arrangement may be made without departing from the spirit and scope of the invention as defined in the appended claims.

We claim:

1. A fluid control system for selectively connecting any one of a plurality of fluid supplies to any one of a plurality of receivers, comprising:

valve means for interconnecting said supplies and receivers; and control means having only a single manual operating element for selectively operating said valve means, said valve means being arranged for cooperation with said control means to be operated thereby to connect a selected one or plurality of said supplies to a selected one or plurality of said receivers, wherein said valve means comprises:

a first fluid duct connecting a first one of said supplies to a first one of said receivers, and having a first valve for controlling fluid flow therethrough;

a second fluid duct connecting a second one of said supplies to a second one of said receivers and having a second valve for controlling fluid flow therethrough; and a third fluid duct connecting said first duct to said second duct downstream of said valve and having a third valve for controlling fluid flow therethrough.

2. The fluid control system of claim 1 wherein each of said switch means comprises a rotary selector switch.

3. The fluid control system of claim 2 wherein said switches are coaxially gauged and said manual operating element comprises a coaxial shaft and operating knob.

4. The fluid control system of claim 1 wherein said valved means comprises:

a first fluid duct connecting a first one of said supplies to a first one of said receivers and having a first valve for controlling fluid flow therethrough;

a second fluid duct connecting a second one of said supplies to a second one of said receivers and having a second valve for controlling fluid flow therethrough;

a third fluid duct connecting said first duct to said second duct downstream of said valves and having a third valve for controlling fluid flow therethrough;

a fourth fluid duct connecting a third one of said supplies to a third one of said receivers and having a fourth valve for controlling fluid flow therethrough; and a fifth fluid duct connecting said second duct to said fourth duct downstream of said valves thereof and having a fifth valve for controlling fluid flow therethrough.

5. The fluid control system of claim 1 including display means adjacent said operating element indicating the open or closed condition of said valved means.

6. A fluid control system for controlling fluid flow from a plurality of sources to a plurality of fluid receivers comprising; a plurality of fluid sources, a plurality of fluid receivers, ducting means connecting said plurality of fluid sources with said plurality of fluid receivers, a plurality of valve means for selectively opening and closing sections of said ducting means, control means for opening a first group of said valves to direct fluid flow from a first group of one or more of said fluid sources to a first group of one of more of said fluid receivers, and for simultaneously opening a second group of said valves to direct fluid flow from a second group of one or more of said fluid sources to a second group of one or more of said fluid receivers, and means for operating said control means including a single manually operated selector element.

7. The device of claim 6 wherein said control means for opening and closing said valves comprises:

a plurality of rotary electrical switches; and means for positioning said switches operated by said single manually operated selector element.